(12) United States Patent
Ban et al.

(10) Patent No.: US 11,674,243 B2
(45) Date of Patent: *Jun. 13, 2023

(54) WOVEN ARTICLE FOR CARBON FIBER REINFORCED PLASTIC AND MOLDED PRODUCT FORMED THEREFROM

(71) Applicant: Lotte Chemical Corporation, Seoul (KR)

(72) Inventors: Kyun Ha Ban, Uiwang-si (KR); Yun Seok Bae, Uiwang-si (KR); Chang Min Hong, Uiwang-si (KR)

(73) Assignee: Lotte Advanced Materials Co., Ltd., Seoul (KR)

( * ) Notice: Subject to any disclaimer, the term of this patent is extended or adjusted under 35 U.S.C. 154(b) by 564 days.

This patent is subject to a terminal disclaimer.

(21) Appl. No.: 16/345,787

(22) PCT Filed: Oct. 30, 2017

(86) PCT No.: PCT/KR2017/012048
§ 371 (c)(1),
(2) Date: Apr. 29, 2019

(87) PCT Pub. No.: WO2018/080251
PCT Pub. Date: May 3, 2018

(65) Prior Publication Data
US 2019/0264353 A1    Aug. 29, 2019

(30) Foreign Application Priority Data

Oct. 31, 2016  (KR) ........................ 10-2016-0143624

(51) Int. Cl.
*D02G 3/40* (2006.01)
*D03D 15/47* (2021.01)
(Continued)

(52) U.S. Cl.
CPC .............. *D02G 3/402* (2013.01); *C08J 5/247* (2021.05); *D03D 15/275* (2021.01);
(Continued)

(58) Field of Classification Search
CPC ............ D10B 2101/12; D10B 2505/02; D03D 15/275; D03D 15/283; C08J 5/247; Y02W 30/62
See application file for complete search history.

(56) References Cited

U.S. PATENT DOCUMENTS 3,628,995 A    12/1971   Economy et al.
4,014,725 A     3/1977   Schulz
(Continued)

FOREIGN PATENT DOCUMENTS

CN    104141189 A     11/2014
EP      2642007 A1     9/2013
(Continued)

OTHER PUBLICATIONS

Huang—"Fabrication and Properties of Carbon Fibers", Materials (2), pp. 2369-2403 (Year: 2009).*

(Continued)

*Primary Examiner* — Elizabeth Mary Cole Imani
(74) *Attorney, Agent, or Firm* — Additon, Pendleton & Witherspoon, P.A.

(57) ABSTRACT

A woven article for a carbon fiber reinforced plastic according to the present invention is a woven article of a spun yarn containing: about 10 wt % to about 60 wt % of a carbon fiber staple in which the content of carbon components is equal to or greater than about 97 wt %; and about 40 wt % to about 90 wt % of a thermoplastic resin fiber, wherein the carbon fiber staple is obtained by carbonizing carbon fiber reinforced plastic scrap at a temperature of about 900 to about 1400° C. The woven article for a carbon fiber reinforced
(Continued)

plastic includes a carbon fiber staple manufactured from scrap generated during manufacture of the carbon fiber reinforced plastic, and allows economic recycling of the carbon fiber reinforced plastic scrap without a reduction in mechanical properties. When molded, productivity is high due to a short cycle time, there is almost no orientation, and an excellent flexural modulus is exhibited.

10 Claims, 1 Drawing Sheet

(51) Int. Cl.
  D03D 15/275   (2021.01)
  D03D 15/283   (2021.01)
  D03D 15/573   (2021.01)
  D03D 15/41    (2021.01)
  C08J 5/24     (2006.01)

(52) U.S. Cl.
  CPC .......... *D03D 15/283* (2021.01); *D03D 15/41* (2021.01); *D03D 15/47* (2021.01); *D03D 15/573* (2021.01); *D10B 2101/12* (2013.01); *D10B 2401/063* (2013.01); *D10B 2505/12* (2013.01)

(56) References Cited

U.S. PATENT DOCUMENTS

| | | | |
|---|---|---|---|
| 4,457,345 | A | 7/1984 | von Blucher et al. |
| 5,328,764 | A | 7/1994 | McCullough, Jr. et al. |
| 6,583,075 | B1 | 6/2003 | Dugan |
| 8,349,447 | B2 | 1/2013 | Nakayama et al. |
| 10,145,028 | B2 | 12/2018 | Choi et al. |
| 10,577,729 | B2 * | 3/2020 | Ban .................. D02G 3/047 |
| 2007/0218280 | A1 | 9/2007 | Yabuki et al. |
| 2013/0118142 | A1 | 5/2013 | Gommel et al. |
| 2013/0192189 | A1 | 8/2013 | Lawrence et al. |
| 2013/0192434 | A1 | 8/2013 | Hashimoto et al. |
| 2013/0199412 | A1 | 8/2013 | Christ et al. |
| 2014/0245577 | A1 | 9/2014 | Sepati et al. |
| 2016/0237248 | A1 | 8/2016 | Christ et al. |
| 2017/0350040 | A1 | 12/2017 | Ijuin |

FOREIGN PATENT DOCUMENTS

| | | | | |
|---|---|---|---|---|
| GB | | 2477531 | A | 8/2011 |
| GB | | 2477534 | A | 8/2011 |
| JP | | 07-033904 | A | 2/1995 |
| JP | | 2011-122032 | A | 6/2011 |
| JP | | 5932576 | B2 | 6/2016 |
| KR | | 10-0837764 | B1 | 6/2008 |
| KR | 10-2012-0104629 | A | | 9/2012 |
| KR | 10-2013-0139857 | A | | 12/2013 |
| KR | 10-2016-0012429 | A | | 2/2016 |
| WO | WO-03089212 | A1 * | 10/2003 | ............ B29B 17/02 |
| WO | | 2012/000827 | A2 | 1/2012 |
| WO | | 2016/104467 | A1 | 6/2016 |
| WO | | 2018/080251 | A1 | 5/2018 |

OTHER PUBLICATIONS

Barnhardt "The Case the Blending Purified Cotton in Nonwovens" from https://barnhardtcotton.net/blog/case-blending-purified-cotton-nonwovens/ (Year: 2016).*
Vieille et al. "About the Impact Behavior of Woven-Ply Carbon Fiber-Reinforced Thermoplastic- and Thermosetting-Composites: A Comparative Study", Composite Structures (101), pp. 9-21, 2013. (Year: 2013).*
Department of Defense "Plastic Matrix Composites with Continuous Fiber Reinforcement" Military Handbook MIL-HDBK-754 (AR), Chapter 2, Sep. 19, 1991 from https://apps.dtic.mil/sti/pdfs/ADA307849.pdf (Year: 1991).*
Search Report in counterpart European Application No. 17865573.4 dated Apr. 22, 2020, pp. 1-15.
International Search Report in counterpart International Application No. PCT/KR2017/012048 dated Jan. 30, 2018, pp. 1-4.
Search Report in commonly owned European Application No. 17188246.7 dated Feb. 12, 2018, pp. 1-13.
M Hengstermann et al: "Development of new hybrid yarn construction from recycled carbon fibers for high performance composites. Part-I: basic processing of hybrid carbon fiber/polyamide 6 yarn spinning from virgin carbon fiber staple fibers", Textile Research Journal, vol. 86, No. 12, Jul. 5, 2016 (Jul. 5, 2016), pp. 1307-1317, XP055446605, GB.
Office Action in commonly owned Chinese Patent Application No. 201710748513.4 dated Jul. 22, 2019, pp. 1-6.
Office Action in commonly owned Korean Application No. 10-2016-0110369 dated Jun. 20, 2018, pp. 1-6.
Petterson, "Carbon Fiber Biocompatibility for Implants", Fibers (Basel), vol. 4, No. 1, 2016, pp. 1-20, PubMed ID 4782804 (Year 2016).
Oliveux et al., "Current status of recycling of fibre reinforced polymers: Review of technologies, reuse and resulting properties", Progress in Materials Science, vol. 72, 2015, pp. 61-99 (Year 2015).
Morin et al., "Near- and supercritical solvolysis of carbon fibre reinforced polymers (CFRPs) for recycling carbon fibers as a valuable resource: State of the art", The Journal of Supercritical Fluids, vol. 66, 2012, pp. 232-240, doi: 10.1016/jsupflu.2012.02.001 (Year 2012).
Akonda et al., "Recycled carbon fibre-reinforced polypropylene thermoplastic composites", Composites Part A: Applied Science and Manufacturing, vol. 43, No. 1, 2012, pp. 79-86, doi: 10.1016/j.compositesa.2011.09.014 *Year 2011).
Asmatulu et al., "Recycling of fiber-reinforced composites and direct structural composite recycling concept" Journal of Composite Materials, 48(5), 593-608, https://doi.org/10.1177/0021998313476325 (Year: 2014).

* cited by examiner

[FIG. 1]
[FIG. 2]
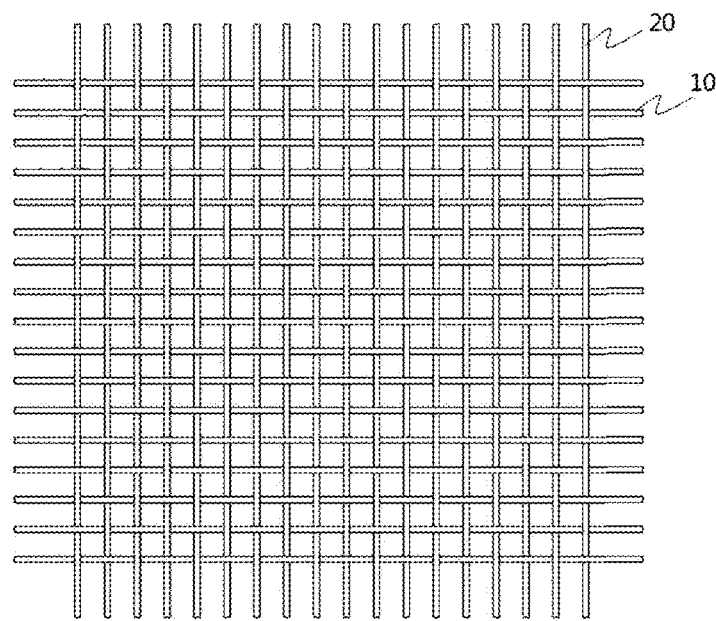

WOVEN ARTICLE FOR CARBON FIBER REINFORCED PLASTIC AND MOLDED PRODUCT FORMED THEREFROM

CROSS-REFERENCE TO RELATED APPLICATIONS

This application claims priority to and the benefit of International Application No. PCT/KR2017/012048, filed Oct. 30, 2017, which published as WO 2018/080251 on May 3, 2018; and Korean Patent Application No. 10-2016-0143624 filed in the Korean Intellectual Property Office on Oct. 31, 2016, the entire disclosure of each of which is incorporated herein by reference.

TECHNICAL FIELD

The present invention relates to a woven article for carbon fiber-reinforced plastics and a molded article formed of the same. More particularly, the present invention relates to a woven article for carbon fiber-reinforced plastics which is manufactured using plastic scrap generated in manufacture of carbon fiber-reinforced plastic products, and a molded article (carbon fiber-reinforced plastic product) formed of the same.

BACKGROUND ART

Carbon fiber-reinforced plastics (CFRPs) have been attracting attention as a next-generation composite material due to much lighter weight than metals and high rigidity and are used as a lightweight structure for automobiles and aircraft.

Since carbon fiber-reinforced plastics require a complex processing procedure, which is mostly automated, a large amount of plastic scrap is generated in manufacture of plastic products. However, it is difficult to find a proper way to dispose of or reuse the CFRP scrap.

A typical way of recycling CFRP scrap is finely cutting and burning the CFRP scrap or forming the CFRP scrap into a master batch to be used in compounding products. However, this method is not widely used due to complexity and low-efficiency thereof. Moreover, since carbon fibers having a high carbon content can become a single yarn or can be broken during processing due to high tensile modulus thereof, it can be difficult to manufacture a molded article using recycled CFRP scrap including the carbon fibers. Also, such a molded article can suffer from deterioration in mechanical properties, conductivity and the like due to change of the carbon fibers into a single yarn.

Therefore, there is a need for a woven article for carbon fiber-reinforced plastics which can be economically recycled from CFRP scrap without deterioration in mechanical properties and the like, and a molded article (CFRP product) manufactured using the same.

The background technique of the present invention is disclosed in Korean Patent Publication No. 2013-0139857.

DISCLOSURE

Technical Problem

It is one object of the present invention is to provide a woven article for carbon fiber-reinforced plastics which can be economically recycled from a carbon fiber-reinforced plastic (CFRP) scrap without deterioration in mechanical properties and the like, and a molded article formed of the same.

It is another object of the present invention to provide a woven article for carbon fiber-reinforced plastics which can reduce molding cycle time, thereby providing high productivity while having almost no orientation and good flexural modulus, and a molded article formed of the same.

These and other objects of the present invention can be achieved by the present invention described below.

Technical Solution

One aspect of the present invention relates to a woven article for carbon fiber-reinforced plastics. The woven article for carbon fiber-reinforced plastics is manufactured using spun yarn including about 10 wt % to about 60 wt % of staple carbon fibers having a carbon content of about 97 wt % or more and about 40 wt % to about 90 wt % of thermoplastic resin fibers, wherein the staple carbon fibers are obtained by carbonizing carbon fiber-reinforced plastic scrap at about 900° C. to about 1,400° C.

In one embodiment, the spun yarn may have an average diameter of about 0.5 mm to about 3.0 mm.

In one embodiment, the staple carbon fiber may have a tensile modulus of about 100 GPa to about 1,000 GPa, as measured in accordance with ASTM D3379.

In one embodiment, the staple carbon fibers may have an average diameter of about 5 μm to about 10 μm and an average length of about 20 mm to about 100 mm.

In one embodiment, the thermoplastic resin fibers may include at least one selected from the group consisting of a polyamide resin, a polyester resin, and an acrylic resin.

In one embodiment, the thermoplastic resin fibers may have an average diameter of about 5 μm to about 30 μm and an average length of about 10 mm to about 110 mm.

In one embodiment, the woven article may be impregnated with a thermoplastic resin.

In one embodiment, the woven article may have a notched Izod impact strength of about 3.5 kgf·cm/cm or more, as measured on a ⅛" thick specimen prepared by compression molding of the woven article in accordance with ASTM D256.

In one embodiment, the woven article may have a flexural modulus of about 5 GPa to about 35 GPa, as measured on ¼" thick specimens prepared by compression molding of the woven article in a longitudinal direction (X-axis direction) and in a perpendicular direction (Y-axis direction) with respect to the longitudinal direction, respectively, in accordance with ASTM D790, and a difference between flexural moduli of the specimen compressed in the X-axis direction and the specimen compressed in the Y-axis direction ranges from about −5% to about 5%.

Another aspect of the present invention relates to a method of manufacturing a woven article for carbon fiber-reinforced plastics. The method includes: preparing spun yarn by blend-spinning about 10 wt % to about 60 wt % of staple carbon fibers having a carbon content of about 97 wt % or more and about 40 wt % to about 90 wt % of thermoplastic resin fibers; and weaving the spun yarn, wherein the staple carbon fibers are obtained by carbonizing a carbon fiber-reinforced plastic scrap at about 900° C. to about 1,400° C.

In one embodiment, preparing the spun yarn by blend-spinning the staple carbon fibers and the thermoplastic resin fibers may include carding, combing, and spinning steps.

A further aspect of the present invention relates to a molded article formed of the woven article for carbon fiber-reinforced plastics set forth above.

In one embodiment, the molded article may be manufactured by compression molding of the woven article.

Advantageous Effects

The present invention provides a woven article for carbon fiber-reinforced plastics which can be economically recycled from a carbon fiber-reinforced plastic (CFRP) scrap without deterioration in mechanical properties and the like and can reduce molding cycle time, thereby providing high productivity while having almost no orientation and good flexural modulus, and a molded article formed of the same.

DESCRIPTION OF DRAWINGS

FIG. 1 is a schematic view of spun yarn manufactured according to one embodiment of the present invention.

FIG. 2 is a schematic view of a woven article according to one embodiment of the present invention.

BEST MODE

Hereinafter, exemplary embodiments of the present invention will be described in detail with reference to the accompanying drawings.

A woven article for carbon fiber-reinforced plastics according to the present invention is manufactured by weaving spun yarn including about 10% by weight (wt %) to about 60 wt % of staple carbon fibers having a carbon content of about 97 wt % or more and about 40 wt % to about 90 wt % of thermoplastic resin fibers. Here, the staple carbon fibers are manufactured (recycled) from carbon fiber-reinforced plastic (CFRP) scrap, which is a residue generated in manufacture of carbon fiber-reinforced plastic (CFRP) products. For example, the staple carbon fibers may be obtained by carbonizing the carbon fiber-reinforced plastic scrap at about 900° C. to about 1,400° C., for example, about 1,000° C. to about 1,300° C. Within this range of carbonization temperature, the staple carbon fibers can have a carbon content of about 97 wt % or more.

In some embodiments, the staple carbon fibers may have a carbon content of about 97 wt % or more, for example, about 98 wt % to about 99.9 wt %, as measured by thermogravimetric analysis (TGA). In addition, the staple carbon fibers may have an average diameter (D50) of about 5 μm to about 10 μm, for example, about 6 μm to about 8 μm and an average length of about 20 mm to about 100 mm, for example, about 30 mm to about 90 mm, as measured by microscopy. If the carbon content of the staple carbon fibers is less than about 97 wt %, the staple carbon fibers can have a low tensile modulus. If the average diameter of the staple carbon fibers is less than about 5 μm, the staple carbon fibers can exhibit poor workability in manufacture of the spun yarn while having low conductivity, whereas, if the average diameter of the staple carbon fibers exceeds about 10 μm, the staple carbon fibers can be easily broken. If the average length of the staple carbon fibers is less than about 20 mm, the staple carbon fibers can have a low tensile modulus, whereas, if the average length of the staple carbon fibers exceeds about 100 mm, the staple carbon fibers can exhibit poor workability during a carding process in manufacture of the spun yarn, causing reduction in productivity.

In some embodiments, the staple carbon fibers may have a tensile modulus of about 100 GPa to about 1,000 GPa, for example, about 110 GPa to about 990 GPa, as measured in accordance with ASTM D3379. Within this range, the spun yarn including the staple carbon fibers can have good mechanical properties such as tensile modulus.

In some embodiments, the staple carbon fibers may be present in an amount of about 10 wt % to about 60 wt %, for example, about 10 wt % to about 50 wt %, specifically about 15 wt % to about 45 wt %, based on the total weight of the spun yarn. If the amount of the staple carbon fibers is less than about 10 wt % based on the total weight of the spun yarn, a molded article manufactured using the woven article can have a low flexural modulus, whereas, if the amount of the staple carbon fibers exceeds about 60 wt %, a molded article manufactured using the woven article can have poor impact resistance.

In some embodiments, the thermoplastic resin fibers may be formed of a typical thermoplastic resin used in synthetic fibers or thermoplastic resin compositions. For example, the thermoplastic resin fibers may have the same composition as a thermoplastic resin used in carbon fiber-reinforced plastic products.

In some embodiments, the thermoplastic resin fibers may include aramid fibers; polyamide fibers such as nylon fiber; polyester fibers; acrylic fibers; and combinations thereof.

In some embodiments, the thermoplastic resin fiber may have an average diameter D50 of about 5 μm to about 30 μm, for example, about 6 μm to about 25 μm, and an average length of about 10 mm to about 110 mm, for example, about 20 mm to about 100 mm, as measured by microscopy. Within these ranges, the spun yarn can have good mechanical properties.

In some embodiments, the thermoplastic resin fibers may be present in an amount of about 40 wt % to about 90 wt %, for example, about 50 wt % to about 90 wt %, specifically about 55 wt % to about 85 wt %, based on the total weight of the spun yarn. If the amount of the thermoplastic resin fibers is less than about 40 wt % based on the total weight of the spun yarn, a molded article manufactured using the woven article can have poor impact resistance, whereas, if the amount of the thermoplastic resin fibers exceeds about 90 wt %, a molded article manufactured using the woven article can have poor flexural modulus.

In some embodiments, the spun yarn may be manufactured by blend-spinning the staple carbon fibers and the thermoplastic resin fibers. Specifically, the spun yarn may be manufactured by carbonizing the carbon fiber-reinforced plastic scrap at about 900° C. to about 1,400° C., for example, about 1,000° C. to about 1,300° C. to prepare the staple carbon fibers, followed by blend-spinning the staple carbon fibers and the thermoplastic resin fibers.

In some embodiments, the spun yarn may have an average diameter (D50) of about 0.5 mm to about 3.0 mm, for example, about 1.0 mm to about 2.5 mm, as measured by microscopy, without being limited thereto.

In some embodiments, the staple carbon fibers prepared through the carbonization process may have a carbon content of about 97 wt % or more, for example, about 98 wt % to about 99.9 wt %, as measured before the blend-spinning process by thermogravimetric analysis (TGA). In addition, the staple carbon fibers may have an average diameter (D50) of about 5 μm to about 10 μm, for example, about 6 μm to about 8 μm, and an average length of about 60 mm to about 120 mm, for example, about 65 mm to about 115 mm, as measured before the blend-spinning process by microscopy. Within these ranges, the spun yarn including the staple carbon fibers can be manufactured in high productivity while having good mechanical properties.

In some embodiments, the staple carbon fibers may have a tensile modulus of about 100 GPa to about 1,000 GPa, for example, about 110 GPa to about 990 GPa, as measured in accordance with ASTM D3379. Within this range, the spun yarn including the staple carbon fibers can have good mechanical properties such as tensile modulus.

In some embodiments, a process of manufacturing the spun yarn by blend-spinning the staple carbon fibers and the thermoplastic resin fibers may include steps of carding, combing, and spinning. In the carding step, the staple carbon fibers and the thermoplastic resin fibers are arranged in parallel, followed by brushing to prepare a thick sliver. In the combing step, the sliver is finely combed. In the spinning step, the sliver is stretched and then twisted to about 100 TPM (twist per meter) to about 200 TPM to obtain the spun yarn, followed by winding the spun yarn. In addition, the process of manufacturing the spun yarn may optionally include, before the carding step, a pretreatment step for minimizing breakage of the staple carbon fibers.

FIG. 1 is a schematic view of the spun yarn manufactured according to one embodiment of the present invention. Referring to FIG. 1, the spun yarn according to the present invention may be blended spun yarn in which the thermoplastic resin fibers 1 are mixed with the staple carbon fibers 2.

The woven article according to one embodiment of the present invention may be manufactured by weaving the spun yarn. The spun yarn may be woven into the woven article by any suitable method known in the art. For example, the method of weaving the spun yarn may include feeding plural spun yarn threads (warps) in a longitudinal direction and weaving plural spun yarn threads (wefts) with the warps in an orthogonal pattern. The manufactured woven article may be produced into various clothes.

FIG. 2 is a schematic view of a woven article according to one embodiment of the present invention. Referring to FIG. 2, the woven article according to the present invention may have the form of a typical woven article in which plural spun yarn threads 20 (wefts) are woven with plural spun yarn threads 10 (warps).

In some embodiments, the woven article may be impregnated with a thermoplastic resin. The thermoplastic resin may be any typical thermoplastic resin used in woven articles, and may include, for example, an aramid resin; a polyamide resin such as nylon; a polyester resin; an acrylic resin; an epoxy resin; and combinations thereof. Here, the thermoplastic resin and the thermoplastic resin fibers may be present in total in an amount of about 40 wt % to about 90 wt %, for example, about 50 wt % to about 90 wt %, specifically about 55 wt % to about 85 wt %, based on the total weight of the woven article. Within this range, the woven article can have good mechanical properties.

In some embodiments, the woven article may have a flexural modulus of about 5 GPa to about 35 GPa, for example, about 10 GPa to about 30 GPa, as measured on ¼" thick specimens prepared by compression molding of the woven article in a longitudinal direction (X-axis direction) and in a perpendicular direction (Y-axis direction) with respect to the longitudinal direction, respectively, in accordance with ASTM D790. In addition, a difference between flexural moduli of the specimen compressed in the X-axis direction and the specimen compressed in the Y-axis direction may range from about −5% to about 5%. Thus, even a molded article having a complex structure can exhibit uniform physical properties throughout and have no orientation and thus less warpage.

In some embodiments, the woven article may have a molding cycle time about 4 to 6 times as short as that of a typical carbon fiber-reinforced plastic (CFRP) product. Since the woven article can be produced into a molded article only by compression molding without a conventional resin impregnation process and curing process, the woven article has a short molding cycle time of about 10 to 60 minutes, for example, about 20 to 40 minutes.

A molded article (carbon fiber-reinforced plastic product) according to the present invention is formed of the woven article set forth above. For example, the woven article may be stacked in one or more layers, followed by a compression molding process known in the art, thereby obtaining a molded article having a desired thickness and shape. As such, the woven article according to the present invention can be economically recycled from CFRP scrap without deterioration in mechanical properties and can be produced back into a CFRP product (molded article) by a simple molding process.

MODE FOR INVENTION

Next, the present invention will be described in more detail with reference to some examples. It should be understood that these examples are provided for illustration only and are not to be in any way construed as limiting the present invention. In addition, description of details apparent to those skilled in the art will be omitted for clarity.

EXAMPLE

Examples 1 to 4: Manufacture of Woven Article and Preparation of Specimen for Property Evaluation Using the Same Carbon fiber-reinforced plastic (CFRP) scrap containing carbon fibers having a carbon content of 50 wt %, an average diameter (D50) of 6 μm, and an average length of 90 mm was carbonized at 1,300° C., thereby preparing staple carbon fibers (A1) having a carbon content of 98 wt %, an average diameter (D50) of 6 μm, an average length of 90 mm and a tensile modulus of 250 GPa. Then, the prepared staple carbon fibers (A1) and thermoplastic resin fibers (B) (nylon (PA6) fibers, manufacturer: KP Chemtech Corp.) having an average diameter (D50) of 6 μm and an average length of 90 mm were mixed in amounts as listed in Table 1, followed by a blend-spinning process including carding, combing and spinning steps, thereby preparing spun yarn having an average diameter (D50) of 1.5 mm. In the prepared spun yarn, the staple carbon fibers A1 had an average diameter (D50) of 6 μm and an average length of 50 mm. The prepared spun yarn was woven into a woven article having a size of 100 cm×100 cm×1.5 mm in the form of a cloth. The woven article was stacked in multiple layers to a desired thickness, followed by compression molding, thereby preparing a specimen. The prepared specimen was evaluated as to flexural modulus, impact resistance, and molding cycle time by the following property evaluation methods. Results are shown in Table 1.

Comparative Example 1

Spun yarn (average diameter (D50): 1.5 mm) was prepared using newly manufactured carbon fibers (A2) (carbon content: 97 wt %, average diameter (D50): 6 μm), followed by manufacture of a woven article using the prepared spun yarn. Then, 50 parts by weight of the woven article was impregnated with 50 parts by weight of an epoxy resin solution, followed by compression and curing, thereby preparing a specimen.

Property Evaluation (1) Flexural modulus (unit: GPa): Flexural modulus (in the X-axis and Y-axis directions) was measured on ¼" thick specimens prepared by compression molding of the woven article in the longitudinal direction (X-axis direction) and in the perpendicular direction (Y-axis direction) with respect to the longitudinal direction, respectively, using a universal testing machine (UTM) in accordance with ASTM D790.

(2) Impact resistance (unit: kgf·cm/cm): Notched Izod impact strength was measured on a ⅛" thick specimen prepared by compression molding of the woven article in accordance with ASTM D256.

(3) Cycle time (unit: minute): A specimen was prepared using each of the woven articles prepared in Examples 1 to 4 and Comparative Example 1, followed by measurement of the total time taken to manufacture a molded article using the specimen.

TABLE 1

|  | Example | | | | Comparative Example |
|---|---|---|---|---|---|
|  | 1 | 2 | 3 | 4 | 1 |
| (A1) (wt %) | 50 | 40 | 30 | 20 | — |
| (A2) (wt %) | — | — | — | — | 50 |
| (B) (wt %) | 50 | 60 | 70 | 80 | — |
| (C) (wt %) | — | — | — | — | 50 |
| Flexural modulus (X-axis) | 30 | 20 | 15 | 10 | 40 |
| Flexural modulus (Y-axis) | 30 | 20 | 15 | 10 | 40 |
| Impact resistance | 4 | 5 | 7 | 10 | 3 |
| Cycle time (min) | 20 to 40 | 20 to 40 | 20 to 40 | 20 to 40 | 240 to 300 |

From the results shown in Table 1, it can be seen that the woven article manufactured using the spun yarn recycled from the staple carbon fibers (A1) having a carbon content of 97 wt % or more according to the present invention did not suffer from deterioration in impact resistance despite the presence of the recycled staple carbon fibers, had almost no orientation and good flexural modulus, thereby allowing a molded article manufactured using the woven article to have uniform physical properties and less warpage, and could be directly compression-molded without passing through a conventional impregnation process or curing process, thereby enabling reduction in molding cycle time while improving economic feasibility.

It should be understood that various modifications, changes, alterations, and equivalent embodiments can be made by those skilled in the art without departing from the spirit and scope of the invention.

The invention claimed is:

1. A woven article for carbon fiber-reinforced plastics, the woven article being manufactured using spun yarn comprising 10 wt % to 60 wt % of staple carbon fibers having a carbon content of 97 wt % or more and 40 wt % to 90 wt % of thermoplastic resin fibers,
wherein the staple carbon fibers are obtained by carbonizing a carbon fiber-reinforced plastic scrap at 900° C. to 1,400° C.,
wherein the spun yarn has an average diameter of 0.5 mm to 3.0 mm, and
wherein the staple carbon fibers have a tensile modulus of 100 GPa to 1,000 GPa, as measured in accordance with ASTM D3379, an average diameter of 5 μm to 10 μm and an average length of 65 mm to 100 mm.

2. The woven article according to claim 1, wherein the thermoplastic resin fibers comprise a polyamide resin, a polyester resin, and/or an acrylic resin.

3. The woven article according to claim 1, wherein the thermoplastic resin fibers have an average diameter of 5 μm to 30 μm and an average length of 10 mm to 110 mm.

4. The woven article according to claim 1, wherein the woven article is impregnated with a thermoplastic resin.

5. The woven article according to claim 1, wherein the woven article has a notched Izod impact strength of 3.5 kgf·cm/cm or more, as measured on a 1/8" thick specimen prepared by compression molding of the woven article in accordance with ASTM D256.

6. The woven article according to claim 1, wherein the woven article has a flexural modulus of 5 GPa to 35 GPa, as measured on 1/4" thick specimens prepared by compression molding of the woven article in a longitudinal direction (X-axis direction) and in a perpendicular direction (Y-axis direction) with respect to the longitudinal direction, respectively, in accordance with ASTM D790, and a difference between flexural moduli of the specimen compressed in the X-axis direction and the specimen compressed in the Y-axis direction ranges from −5% to 5%.

7. A method of manufacturing a woven article for carbon fiber-reinforced plastics, comprising:
preparing spun yarn by blend-spinning 10 wt % to 60 wt % of staple carbon fibers having a carbon content of 97 wt % or more and 40 wt % to 90 wt % of thermoplastic resin fibers; and
weaving the spun yarn,
wherein the staple carbon fibers are obtained by carbonizing a carbon fiber-reinforced plastic scrap at 900° C. to 1,400° C.,
wherein the spun yarn has an average diameter of 0.5 mm to 3.0 mm,
wherein the staple carbon fibers have a tensile modulus of 100 GPa to 1,000 GPa, as measured in accordance with ASTM D3379, an average diameter of 5 μm to 10 μm and an average length of 65 mm to 100 mm.

8. The method according to claim 7, wherein preparing the spun yarn by blend-spinning the staple carbon fibers and the thermoplastic resin fibers comprises carding, combing, and spinning steps.

9. A molded article formed of the woven article for carbon fiber-reinforced plastics according to claim 1.

10. The molded article according to claim 9, wherein the molded article is manufactured by compression molding of the woven article.

\* \* \* \* \*